Figure 1:
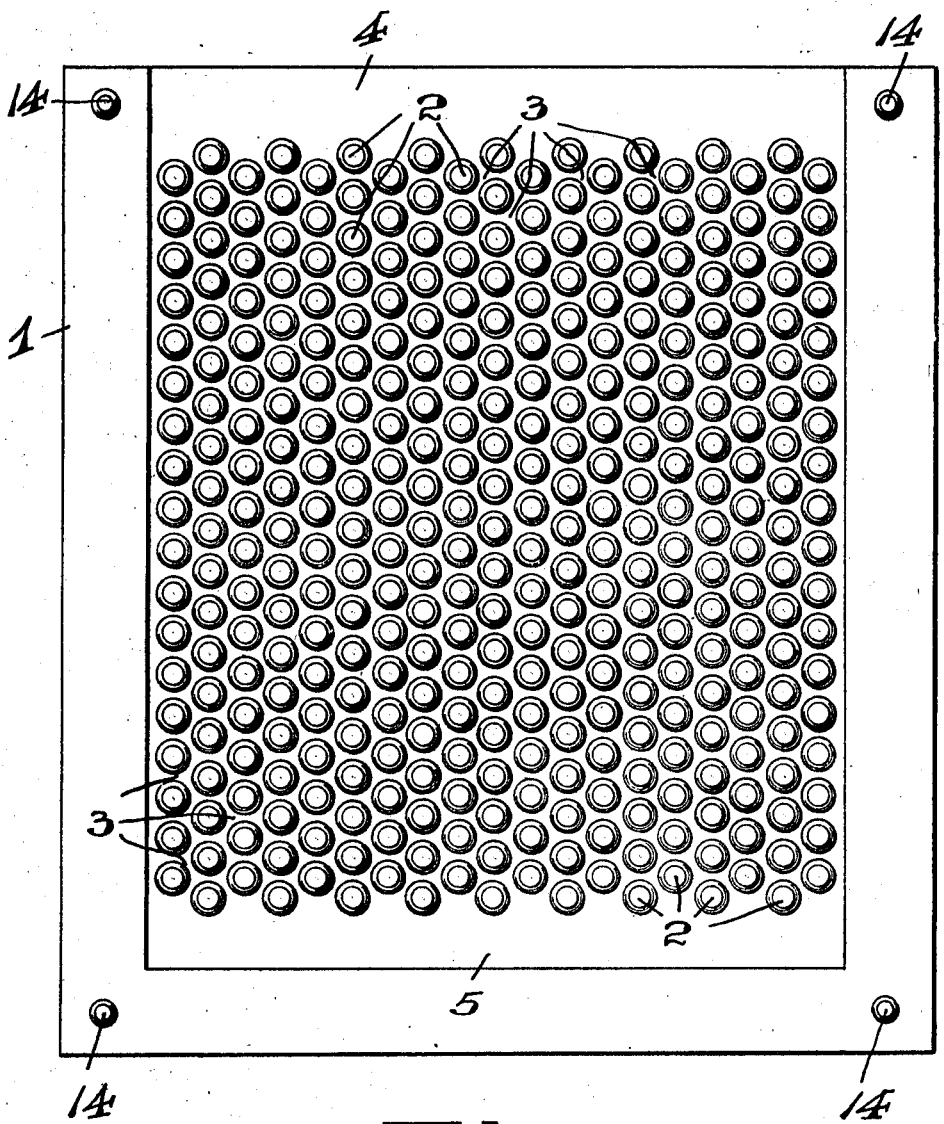

F. A. FELDKAMP.
MOLD.
APPLICATION FILED OCT. 26, 1911.

1,031,334.

Patented July 2, 1912.

2 SHEETS—SHEET 1.

WITNESSES:

INVENTOR:
Frederick A. Feldkamp.
BY
Fraentzel and Richards,
ATTORNEYS

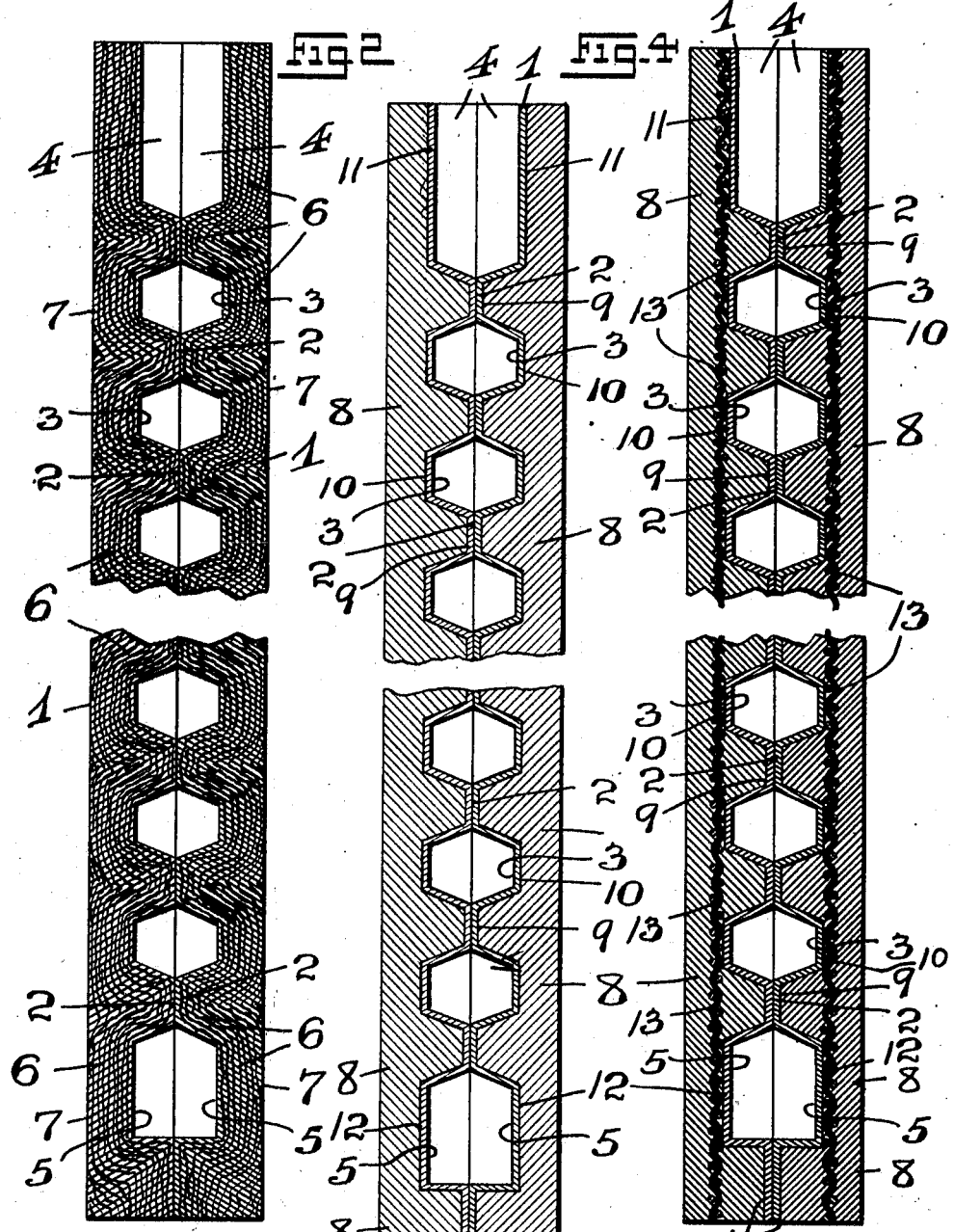

UNITED STATES PATENT OFFICE.

FREDERICK A. FELDKAMP, OF NEWARK, NEW JERSEY, ASSIGNOR TO ELECTROLYTIC PRODUCTS CO., A CORPORATION OF NEW JERSEY.

MOLD.

1,031,334.  Specification of Letters Patent.  Patented July 2, 1912.

Application filed October 25, 1911. Serial No. 656,608.

*To all whom it may concern:*

Be it known that I, FREDERICK A. FELDKAMP, a citizen of the United States, residing at Newark, in the county of Essex and State of New Jersey, have invented certain new and useful Improvements in Molds; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in molds; and, the invention has reference, more particularly, to a novel mold and the mold-sections therefor, with a view of providing reinforced paper mold, or a paper-lined, or a metallically reinforced paper mold and the mold-sections therefor.

My present invention has for its principal object to provide a mold of the general character and the general arrangements and constructions of the parts thereof, as will be hereinafter more fully set forth, with a view of providing a simply constructed and efficiently operating mold, in which the molten metal, when poured into the mold, does not become suddenly chilled and will not rapidly solidify so as to produce an uneven or imperfect casting; and, the invention has for its further object to provide a mold and the mold-sections therefor, which can be most cheaply made, and may be used over and over, to provide great economy in casting.

My present invention has for its further object to provide a reinforced paper mold of the general character hereinafter more particularly set forth, which has flexibility and resiliency, and which is especially adapted for use in producing metallic matrices or grids of a metal which fuses readily at a low temperature, such as are used in the methods of producing automobile radiators made by the processes of electro-deposition, in which metal, as copper, is deposited upon the matrix or grid, and when completely deposited, the matrix or grid being melted out of the deposited copper at a low temperature, so as to leave a complete and hollow shell or casing of the electrolytically deposited copper.

Other objects of the present invention will be clearly obvious from the following detailed description of the present invention.

With the various objects of the present invention in view, the said invention consists, primarily, in the novel mold and mold-sections therefor, more fully set forth in the following specification, and then finally embodied in the clauses of the claim which is appended to and which forms an essential part of this specification.

The invention is clearly illustrated in the accompanying drawings, in which:—

Figure 1 is a face view of one of the separable mold-sections or halves of a mold made according to and embodying the principles of the present invention, said view representing in face view, the paper-portion of the mold; and Fig. 2 is a transverse sectional representation of a mold, the mold-sections thereof being made of paper, reinforced upon the back with other layers of paper, said view being made on an enlarged scale. Figs. 3 and 4 are transverse sectional representations of two modified forms of molds embodying the principles of the present invention, said views being also made on an enlarged scale.

Similar characters of reference are employed in the said above described views, to indicate corresponding parts.

Referring now to the said figures of the drawings, it will be seen that the mold is preferably made in two separable sections or halves, each section comprising a member or element 1 made from suitable organic material, as paper, wood pulp, paper-pulp, linen, or the like, which are suitably formed with raised portions, as 2, and depressed portions, as 3, 4 and 5. It will be understood, however, that these raised portions and depression are not necessarily of the configuration here shown in the accompanying drawings, but that raised portions and depressions of any other suitable configurations may be used, whenever desired.

In the form of mold shown in Fig. 2 of the drawings, and which is entirely made of paper, it will be seen that the paper mold-sections or members 1 are reinforced upon the back with other layers of paper, as 6, the said layers 6 being piled in substantially the manner shown, and being intimately connected by being pressed together, or otherwise assembled, with the outer surface or face of each mold-section being made flat, as at 7.

In Fig. 3 of the drawings, the reference-character 8 indicates a pair of metal plates or sections, each plate or section 8 being made with correspondingly formed raised portions, as 9, and depressions, as 10, 11 and 12, with which the respective raised portions 2 and the depressions 3, 4 and 5 of the paper mold-sections register, substantially in the manner illustrated in said Fig. 3 of the drawings, and whereby two metallically reinforced paper mold-sections or paper lined metallic mold-sections are provided, as will be clearly evident.

In Fig. 4 of the drawings, so as to more positively reinforce the paper reinforcement or the metal-reinforcement of the paper mold-section or member 2, there is embedded in said reinforcement a wire-mesh or other suitable netting or mesh-fabric, as 13, the purpose of which will be clearly evident from an inspection of said Fig. 4.

To provide a complete mold for casting, the two mold-sections thus produced, and as shown in said Figs. 2, 3 and 4, have their faces upon which the raised portions are formed placed face to face, in the manner illustrated in said Figs. 2, 3, and 4, the mold-sections being brought into their registering relation preferably by means of suitably formed and suitably disposed dowels or pins, as 14. Any desirable number of such registering mold-sections can be placed side by side and then assembled in any suitable form of holding means or clamping frame, so as to permit of the pouring of the molten metal into said assembled molds. After the casting have been completed, the several molds are removed from such holding means or clamping frame, the registering mold-sections of each individual mold being easily and quickly separated for the removal of the completed casting, as will be clearly understood.

In practice these molds are to be used, preferably, for the purpose of producing matrices or grids of a metal which fuses at a low temperature, and for that reason the metal plates or sections 8, when used, may be made of a similar metal which is of cheap manufacture; it will be understood, however, that the said members or sections 8 may be made of any other suitable material.

The main advantage in making mold-sections of paper, as herein provided, is that each mold-section is capable of a certain flexibility and resiliency so that the registering raised portions of any two adjacent mold-section when clamped together will become tightly pressed together into intimate contact, so that positively tight joints will be produced, and a perfect casting of the metal which is poured into the assembled mold-sections will be the result, as will be clearly evident. I am aware, therefore, that my present invention is capable of some changes as to the general arrangements and combinations of the several parts, as well as to the material and general configuration and shapes of the said parts. Hence, I do not limit my present invention to the exact arrangements and combinations of the said parts as described in the foregoing specification, except as defined in the claims which are appended hereto; nor do I confine myself to the exact details of the construction, nor to the general configuration of the said parts, as illustrated in the accompanying drawings.

I claim:—

1. A mold comprising a pair of mold-sections having resiliency, each mold-section being made of organic material, and each mold-section having a reinforced face.

2. A mold comprising a pair of mold-sections having resiliency, each mold-section being made of organic material, and each mold-section having a reinforced face, combined with a netting or mesh-fabric within said reinforced face.

3. A mold comprising an outer section or element of metal, and an inner section or element of paper.

4. A mold comprising an outer section or element of metal, and an inner section or element of paper, combined with a netting or mesh-fabric within said metal section or element.

5. A mold comprising a pair of separable members, each member consisting of a section or element of metal and an inner section or element of paper, combined with a netting or mesh-fabric within said metal section or element.

6. A mold-member or half made of organic material, said mold-member having a reinforced face, combined with a netting or mesh-fabric within said reinforced face.

7. A mold-member or half of metal, and a section or element of paper upon one of the faces of said metal mold-member or half.

In testimony, that I claim the invention set forth above I have hereunto set my hand this 13th day of October 1911.

FREDERICK A. FELDKAMP.

Witnesses:
FREDK. C. FRAENTZEL,
FREDK. H. W. FRAENTZEL.